United States Patent
Hall, Sr.

[15] 3,671,001
[45] June 20, 1972

[54] FISHING ROD HOLDER FOR BOATS

[72] Inventor: Harold H. Hall, Sr., 1975 Ocala Road, North Palm Beach, Fla. 33403

[22] Filed: April 16, 1970

[21] Appl. No.: 29,032

[52] U.S. Cl. .................................................................248/43
[51] Int. Cl. ..........................................................A01k 97/10
[58] Field of Search ..............................................248/39–43

[56] References Cited

UNITED STATES PATENTS

| | | | |
|---|---|---|---|
| 3,161,390 | 12/1964 | Larson | 248/40 |
| 2,033,007 | 3/1936 | Raithel | 248/42 |
| 292,977 | 2/1884 | Bradley | 248/43 X |
| 2,591,891 | 4/1952 | Thorsen | 248/40 X |

*Primary Examiner*—William H. Schultz
*Attorney*—Hal H. McCaghren, Esquire

[57] ABSTRACT

A device for supporting a fishing rod on a boat while the rod is unattended. This device includes a sleeve portion for receiving the butt of the fishing rod, the other end having an extension that will be received within the oar lock of the boat. The device also includes a pivotable member for preventing the device from coming out of the oar lock and falling overboard.

1 Claim, 2 Drawing Figures

PATENTED JUN 20 1972　　3,671,001

INVENTOR.
HAROLD H. HALL, Sr.

FISHING ROD HOLDER FOR BOATS

This invention relates to fishing rod holders and the like.

It is therefore the primary purpose of this invention to provide a fishing rod holder for boats which will have sleeve means for receiving the butt of the fishing rod, thus retaining it when the rod is unattended.

Another object of this invention is to provide a fishing rod holder which will have extension means upon the sleeve portion that will be received within the oar lock of the boat, the extension having retaining means to thus prevent the device and the fishing rod from falling overboard if upset from the oar lock.

Other objects of the present invention are to provide a fishing rod holder for boats which is simple in design, inexpensive to manufacture, rugged in construction, easy to use and efficient in operation.

Figure 1:
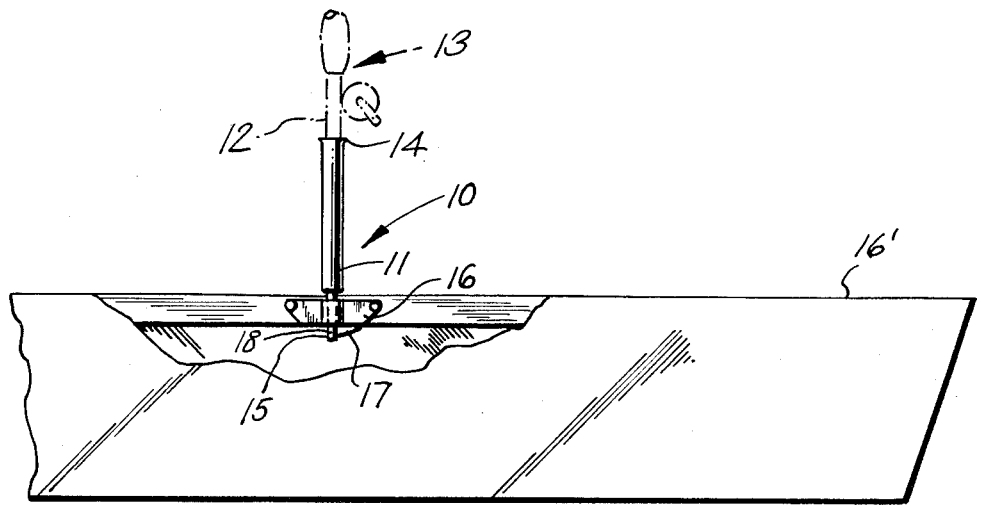
Figure 2:
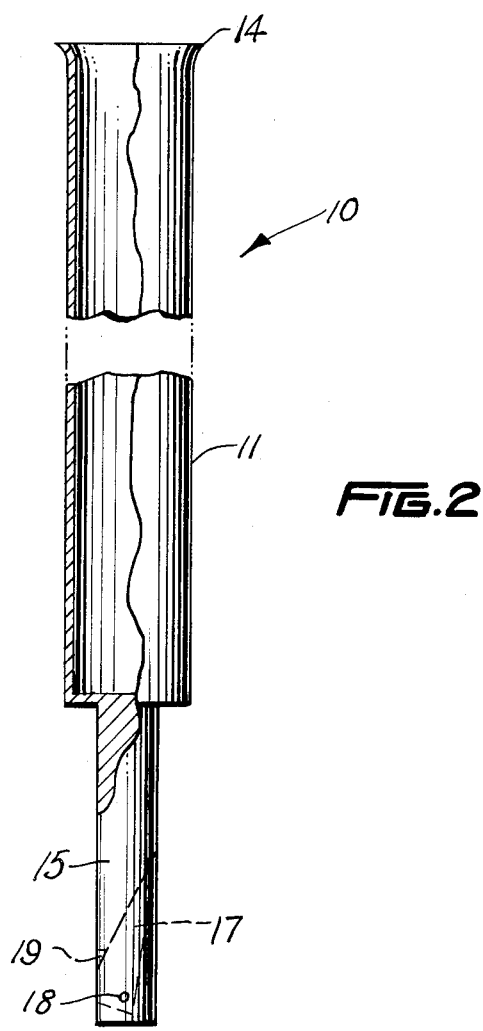

These and other objects will become readily evident upon a study of the following specification together with the accompanying drawing wherein:

FIG. 1 is a verticle view of the present invention shown mounted in a boat which is shown in fragmentation, with a portion of the fishing rod shown in phantom lines; and FIG. 2 is an enlarged verticle view of the device shown in elevation and partly broken away with the butt of the fishing pole shown removed therefrom.

According to this invention, a fishing rod holding device 10 is shown to include an elongated sleeve 11 which freely receives the butt 12 of fishing rod 13. The upper flared end 14 of sleeve 11 is such that the butt 12 of rod 13 is easily placed into sleeve 11 by offering little resistance while inserting it therein. The lower extremity of sleeve 11 is a projecting extension 15 which is inserted into the oar lock 16 of boat 16'. Extension 15 includes a pivotable dug 17 which is carried upon a transverse pin 18 of extension 15. Dug 17 within slot 19 provides a means of preventing sleeve 11 from accidentally being lifted out of oar lock 16 and falling overboard because when it is pivoted outwards it forms stop means by abutting with the lower extremity of the oar lock 16 of boat 16'.

What I now claim is:

1. In combination with a bracket having a passage defined therethrough to receive an elongated member, a fishing rod holder, comprising, a flared sleeve member adapted to receive the butt portion of a fishing rod, an extension projecting from said sleeve and insertable in the said passage defined by said bracket, said extension projecting beyond the passage of said bracket, a longitudinal slot in the free end of said extension, said slot terminating at an angular wall, a dug inserted in said slot and pivotally mounted to said extension, and stop means limiting the rotation of said dug to a position transverse to the longitudinal axis of said extension, said stop means being an angular surface having an angle complementary to said angular wall and adapted and abut said wall.

* * * * *